(12) United States Patent
Masui

(10) Patent No.: US 7,610,116 B2
(45) Date of Patent: Oct. 27, 2009

(54) CENTRALIZED MANAGEMENT UNIT AND MANAGEMENT SYSTEM OF FACILITY EQUIPMENT

(75) Inventor: Hirotaka Masui, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 182 days.

(21) Appl. No.: 11/919,059

(22) PCT Filed: Nov. 21, 2006

(86) PCT No.: PCT/JP2006/323234
§ 371 (c)(1),
(2), (4) Date: Oct. 23, 2007

(87) PCT Pub. No.: WO2007/110996
PCT Pub. Date: Oct. 4, 2007

(65) Prior Publication Data
US 2008/0154397 A1    Jun. 26, 2008

(51) Int. Cl.
G01M 1/38 (2006.01)
G05B 15/00 (2006.01)
G05D 23/00 (2006.01)
G05B 11/01 (2006.01)
G06F 11/00 (2006.01)
F25B 7/00 (2006.01)
G06F 9/32 (2006.01)
H03K 17/00 (2006.01)
G05B 23/02 (2006.01)

(52) U.S. Cl. ............ 700/277; 700/17; 700/19; 700/20; 702/188; 62/175; 340/2.1; 340/3.1; 340/310.11

(58) Field of Classification Search ............ 700/17, 700/19, 20, 277; 702/188; 62/132, 175; 236/46 R, 51, 94; 340/2.1, 3.1, 310.11, 825
See application file for complete search history.

(56) References Cited

U.S. PATENT DOCUMENTS 4,418,333 A * 11/1983 Schwarzbach et al. . 340/310.11

(Continued)

FOREIGN PATENT DOCUMENTS

JP         5-235955 A      9/1993

(Continued)

OTHER PUBLICATIONS

International Search Result dated Mar. 2, 2007.

(Continued)

*Primary Examiner*—Crystal J Barnes-Bullock
(74) *Attorney, Agent, or Firm*—Buchanan Ingersoll & Rooney PC

(57) ABSTRACT

There is provided a compact centralized management unit of facility equipment, as well as a management system using the centralized management unit, that is capable of accommodating changes in data transmission simply and at low cost. The centralized management unit has an input-side interface connected to the facility equipment, an output-side interface for outputting the management data of the facility equipment, a storage section for storing a control program of the facility equipment, and an arithmetic processing section for controlling the facility equipment in accordance with an instruction of the control program. The storage section stores a first transmission program corresponding to the input-side interface and a second transmission program corresponding to an interface of the connection intermediating device. The arithmetic processing section obtains the management data from the facility equipment via the input-side interface in accordance with an instruction of the first transmission program and outputs the management data to the output-side interface in accordance with an instruction of the second transmission program.

11 Claims, 8 Drawing Sheets

U.S. PATENT DOCUMENTS

| | | | | |
|---|---|---|---|---|
| 5,435,147 | A * | 7/1995 | Mochizuki et al. | 62/175 |
| 6,192,282 | B1 * | 2/2001 | Smith et al. | 700/19 |
| 6,454,177 | B1 * | 9/2002 | Sasao et al. | 236/46 R |
| 6,662,077 | B2 * | 12/2003 | Haag | 700/217 |
| 6,736,328 | B1 * | 5/2004 | Takusagawa | 236/51 |
| 6,978,627 | B2 | 12/2005 | Masui et al. | |
| 7,055,043 | B2 * | 5/2006 | Anzai | 713/300 |
| 7,523,872 | B2 * | 4/2009 | Masui et al. | 236/94 |
| 2006/0212175 | A1 * | 9/2006 | Kim et al. | 700/277 |

FOREIGN PATENT DOCUMENTS

| | | |
|---|---|---|
| JP | 10-91421 A | 4/1998 |
| JP | 2000-266390 A | 9/2000 |
| JP | 2003-279114 A | 10/2003 |
| JP | 2004-3842 A | 1/2004 |
| JP | 2006-4403 A | 1/2006 |
| JP | 2006-79632 A | 3/2006 |

OTHER PUBLICATIONS

Office Action in CN 2006800186786 dated Jan. 9, 2009.

* cited by examiner

FIG. 7

(A) PROCESSING PROCEDURE IN SHIPPING OUT OF FACTORY

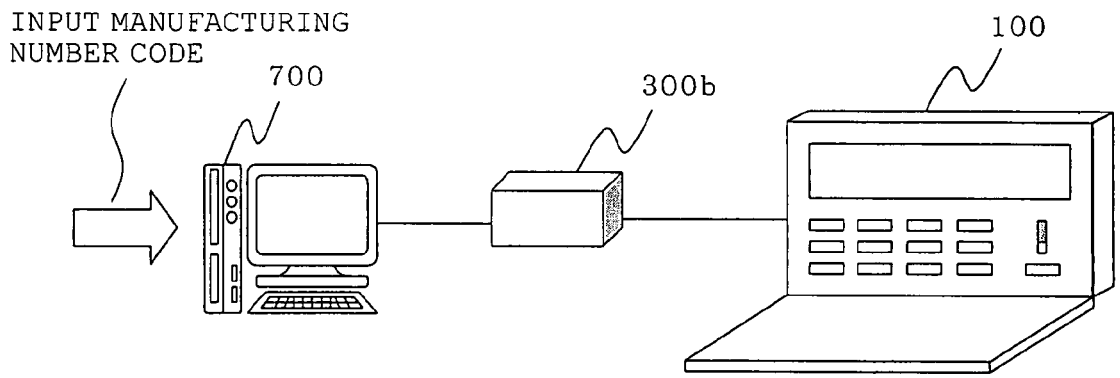

(B) ARITHMETIC OPERATION OF PROGRAM PASSWORD

FIRST TRANSMISSION PROGRAM PASSWORD =
     MANUFACTURING NUMBER CODE x f
    (FIRST TRANSMISSION PROGRAM NUMBER CODE)
    CONTROL PROGRAM PASSWORD =
    MANUFACTURING NUMBER CODE x f
    (CONTROL PROGRAM NUMBER CODE)
    SECOND TRANSMISSION PROGRAM PASSWORD =
    MANUFACTURING NUMBER CODE x f
    (SECOND TRANSMISSION PROGRAM NUMBER CODE)

(C) SECOND TRANSMISSION PROGRAM PASSWORD SETTING PROCEDURE

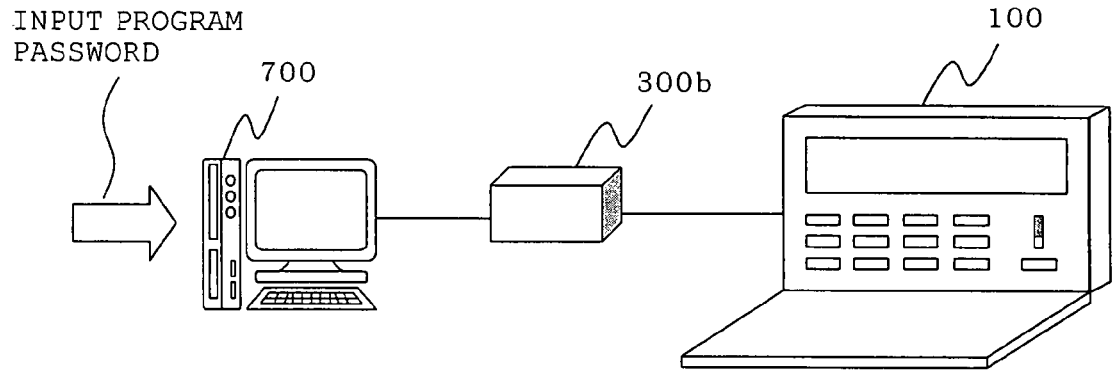

FORWARD FEED SCROLL DISPLAY

<EXAMPLES OF MESSAGE>

ABNORMAL CODE 5102, PRESSURE OF COMPRESSOR No. 2 IS ABNORMAL,

CURRENT PRESSURE 27, NORMAL VALUE 20,   RETURN,

TELEPHONE No. OF SERVICE CENTER 123-4567

CENTRALIZED MANAGEMENT UNIT AND MANAGEMENT SYSTEM OF FACILITY EQUIPMENT

TECHNICAL FIELD

The present invention relates to a centralized management unit for controlling operations and monitoring operating states of facility equipment and to a management system using the centralized management unit.

BACKGROUND ART

As a technology that aims at "remarkably improving management efficiency, services and others by implementing an opened and multi-vendor air-conditioner" in a management system of facility equipment, there has been proposed "a management system of an air-conditioner, including a monitor 100 of the air-conditioner in which an outdoor machine 301 is connected with an indoor machine 302 through a transmission path 401 to transmit/receive control messages, wherein the management system includes PAC transmission software 203 for receiving operation data of temperature and pressure of a main part of a refrigerator cycle from the transmission path 401, and a converter 202 for converting the operation data into setting data and wherein the operation data is sampled out of the control messages per predetermined period to be transmitted to the monitor 100 and the setting data is transmitted to the transmission path 401 as a control message when the data changes" (patent document 1)

Meanwhile, as a technology related to remote monitoring of facility equipment, examples are known in which a modem is built into a centralized management unit or a standard interface connecting port conforming to standard RS232C of EIA (Electronic Industries Association of USA) is provided in a centralized management unit to externally attach a commercially available modem via the connecting port or a PC card insertion port of PCMCIA (Personal Computer Memory Card International Association) type is provided so that a commercially available PC card having a modem function may be inserted into the insertion port.

Because the above-mentioned arrangement allows the centralized management unit to make communications, it becomes possible to monitor the facility equipment by means of remote communications through the centralized management unit.

[Patent Document 1] Japanese Patent Laid-open No. 2004-3842 Gazette (abstract)

DISCLOSURE OF INVENTION

Problem to be Solved by Invention

When a modem is built into a centralized management unit in a known management system of facility equipment, it is unable to use a communication mode such as one by means of GSM (Global System for Mobile Communication) digital portable phone system generally used in Europe, even though the communication mode by means of the modem may be used.

Furthermore, a user who does not require remote monitoring incurs an extra cost by building the modem into the centralized management unit.

Furthermore, although it becomes possible to utilize both the communication modes of modem and GSM by connecting modem interface members and GSM interface members corresponding to the respective de facto standard transmission modes such as the RS232C terminal, PCMCIA connecting port and others, there is a case when such de facto standard communication modes and transmission means change yearly and it may become difficult to obtain such commercially available interface members in the future.

There is also an economical problem in that it is required to continuously develop technologies to follow such changes, increasing a development cost and a technological service cost.

The present invention has been made to solve the above various problems and its object is to provide a compact centralized management unit of facility equipment and a management system using such a centralized management unit that is capable of accommodating changes of data transmission means simply at low cost.

Means for Solving Problem

A centralized management unit of facility equipment of the invention obtains management data by being connected to at least one piece of facility equipment to be managed and transmits the data to a monitoring terminal via a connection intermediating device. The centralized management system has:

an input-side interface connected to the facility equipment to be managed, an output-side interface for outputting the management data of the facility equipment and for receiving information transmitted from the monitoring terminal, a storage section for storing a control program of the facility equipment and an arithmetic processing section for controlling the facility equipment in accordance with an instruction of the control program, wherein the storage section stores a first transmission program corresponding to the input-side interface and a second transmission program corresponding to an interface of the connection intermediating device and the arithmetic processing section obtains the management data from the facility equipment via the input-side interface in accordance with the instruction of the first transmission program and outputs the management data to the output-side interface in a mode corresponding to the interface of the connection intermediating device in accordance with an instruction of the second transmission program.

EFFECT OF INVENTION

The centralized management unit of the facility equipment of the invention brings about an excellent effect that the user who needs no remote monitoring is not required to incur the burden of extra cost because no remote communication means such as the modem is built into the centralized management unit.

The inventive centralized management unit also brings about an excellent effect that it can accommodate to the changes simply at low cost because it can accommodate to different transmission modes just by replacing programs stored in the storage section.

BRIEF DESCRIPTION OF THE DRAWINGS

FIG. 7 shows a procedure related to setting of information of a program usability.

Figure 1:
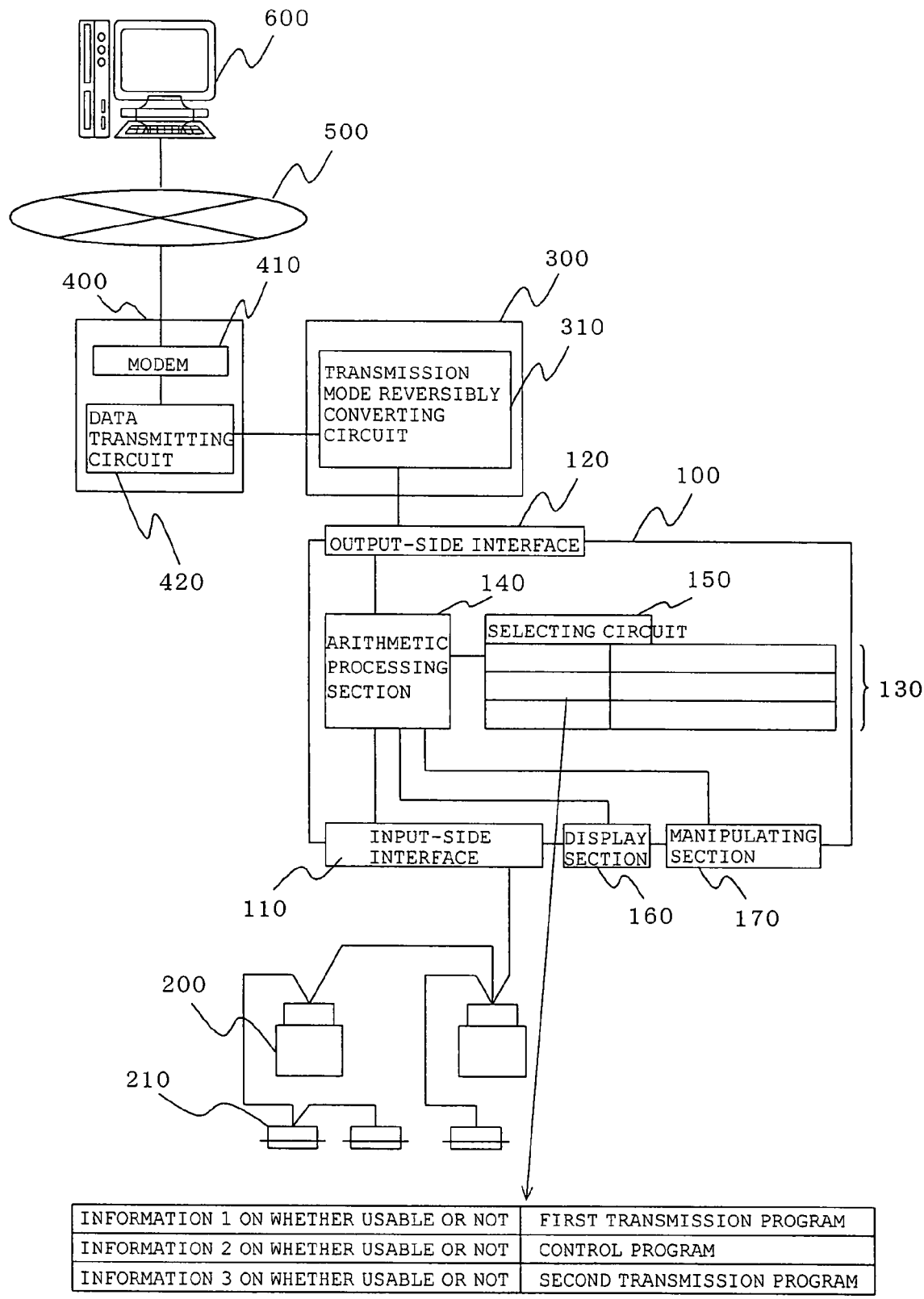
FIG. 1 is a block diagram showing a whole arrangement of a management system of facility equipment according to a first embodiment.

REFERENCE NUMERALS 100 centralized management unit of facility equipment
110 input-side interface
120 output-side interface
130 storage section
140 arithmetic processing section
150 selecting circuit
160 display section
170 manipulating section
180 path switching means
180a switching contact member
180b socket
190 path selection recognizing circuit
200 outdoor machine of air-conditioner
210 indoor machine
300, 300a, 300b interface member
310, 310a, 310b transmission mode reversible converting circuit
320b connector
400 connection intermediating device
410 modem
420 data transmitting circuit
500 public communication line
600 monitoring terminal
700 program setting device
800 building monitoring apparatus
900 building management system

MODE FOR CARRYING OUT THE INVENTION

First through sixth embodiments of the invention will be explained with reference to the appended drawings.

It is noted that in the description of arrangements of the first through sixth embodiments, the same reference numerals will be denoted to equivalent components and detailed and repetitive explanation thereof will be omitted.

First Embodiment

FIG. 1 is a block diagram showing a whole arrangement of a management system of facility equipment according to a first embodiment.

In FIG. 1, the management system includes a centralized management unit 100 of the facility equipment, an outdoor machine 200 of an air-conditioner as the facility equipment to be managed, an indoor machine 210 corresponding to the outdoor machine 200, an interface member 300, a connection intermediating device 400, a public communication line 500 and a monitoring terminal 600.

A structure of each component will be explained below.

The centralized management unit 100 includes an input-side interface 110, an output-side interface 120, a storage section 130, an arithmetic processing section 140, a selection circuit 150, a display section 160 and a manipulating section 170.

The input-side interface 110 is a connection interface connected to the facility equipment to be managed by the centralized management unit 100 allowing management data to be obtained from the facility equipment.

The output-side interface 120 is a connection interface for outputting the management data obtained from the facility equipment and for receiving information transmitted from the monitoring terminal 600.

Both of the input-side interface 110 and the output-side interface 120 are composed of data transmitting circuits.

The storage section 130 stores a control program, a first transmission program and a second transmission program as well as information of usability for each program.

At least one of the individual programs is stored in the storage section 130. Operation of each program will be described later. That all of them are usable is assumed to be set in the information of usability, in the first embodiment.

The arithmetic processing section 140 is composed of a CPU and other components and carries out control of the facility equipment to be managed and processing of data transmission.

The selection circuit 150 has a function of selecting which one of programs stored in the storage section 130 is to be used.

The display section 160 displays operating states of the centralized management unit 100 and the facility equipment to the user of the centralized management unit 100.

The manipulating section 170 is used by the user of the centralized management unit 100 to manipulate setting management conditions and others of the facility equipment.

The centralized management unit 100 manages the operating states of the outdoor machine 200 and the indoor machine 210 of the air-conditioner.

The outdoor machine 200 of the air-conditioner is connected to the input-side interface 110 and is installed at a suitable place within a complex facility not shown. FIG. 1 shows an example in which two outdoor machines 200 are connected to the input-side interface 110.

The indoor machine 210 is installed so as to correspond to each indoor machine 200. In FIG. 1, one indoor machine 210 is connected to one outdoor machine 200 and two indoor machines 210 are connected to the other outdoor machine 200.

The interface member 300 includes a transmission mode reversibly converting circuit 310.

One end of the interface member 300 is connected to the output-side interface 120 and the other end is connected to the connection intermediating device 400.

The transmission mode reversibly converting circuit 310 reversibly converts the transmission modes of electrical signals at the input and output ends.

The transmission mode reversibly converting circuit 310 converts data output from the output-side interface 120 into data what uses a transmission mode corresponding to an interface included in the connection intermediating device 400, and outputs the data. Similarly to that, the transmission mode reversibly converting circuit 310 converts data output from the interface included in the connection intermediating device 400 into data what uses the transmission mode corresponding to the output-side interface 120, and outputs the data.

It is noted that a measure for reinforcing and insulating the interface member 300 is taken through a known method when no such measure is taken for the outdoor machine 200 and the indoor machine 210.

The connection intermediating device 400 is a commercially available digital data transmitting device constructed by using a microprocessor for example and is one type of generally used IT devices.

The connection intermediating device 400 includes a modem 410 and a data transmission circuit 420.

The data transmission circuit 420 is connected to one end of the interface member 300 and is also connected to the connection intermediating device 400.

The modem 410 exchanges data with the data transmission circuit and is also connected to the public communication line 500 to transmit/receive data via the public communication line 500.

The centralized management unit 100 is connected to the public communication line 500 via the interface member 300 and the connection intermediating device 400 and is capable of transmitting/receiving data via the public communication line 500.

The monitoring terminal 600 is provided within a management center not shown constructed at a remote place adequately separated from a place where each of the centralized management units 100 are installed and is adapted to be able to bilaterally communicate with the centralized management unit 100 via the connection intermediating device 400. Thereby, the monitoring terminal 600 is capable of exchanging information with the air-conditioner to be managed by each of the centralized management units 100 or with facility equipment similar to that.

The monitoring terminal 600 may be composed of a computer such as a personal computer.

Next, operation of the centralized management unit 100 will be explained.

(1) Setting of Operating Conditions:

The user manipulates an input manipulation button not shown in the manipulating section 170 to set operating conditions of the air-conditioner.

Data including these operating conditions set and inputted is displayed on the display section 160 and is transferred to the arithmetic processing section 140.

(2) Start of Operation:

On the basis of the data transferred in Step (1), the arithmetic processing section 140 exchanges information with the outdoor machine 200 and the indoor machine 210 via the input-side interface 110.

Operations of the outdoor machine 200 and the indoor machine 210 are controlled in accordance with the data received via the input-side interface 110.

(3) Acquisition of Management Data:

When the outdoor machine 200 and the indoor machine 210 start operations, the arithmetic processing section 140 receives data (management data) indicating operating conditions sampled by sensors not shown via the input-side interface 110 in accordance with an instruction of the first transmission program.

(4) Control based on Management Data:

The arithmetic processing section 140 displays the operating conditions of the air-conditioner on the display section 160, on the basis of the management data thus obtained.

The arithmetic processing section 140 also controls the air-conditioner to be managed in accordance with instructions of a control program read out of the storage section 130 based on the data of operating conditions set and inputted as described above and the management data thus obtained.

(5) Output of Management Data:

The arithmetic processing section 140 reads a second transmission program stored in an address set to be usable among information of usability stored in the storage section 130 and outputs a data (management data) signal indicating the operating states of the air-conditioner to be managed out of the output-side interface 120 in accordance with an instruction of the second transmission program.

Next, operations from the interface member 300 to the connection intermediating device 400 after Step (5) described above will be explained.

(6) Conversion of Signal by means of Interface Member 300:

The interface member 300 reversibly converts the operating state data (management data) signal outputted from the output-side interface 120 so as to adjust to the transmission mode of the data transmission circuit 420. Thereby, the interfaces match in terms of electrical signal between the output-side interface 120 and the data transmission circuit 420 and information may be exchanged.

(7) Transmission of Management Data:

Upon receiving the operating state data (management data) from the data transmission circuit 420, the connection intermediating device 400 converts the operating state data signal received from the modem 410 to transmit the operating state data to the monitoring terminal 600 via the public communication line 500.

(8) Others:

When the transmission mode corresponding to the data transmission circuit 420 is the USB (Universal Serial Bus) mode for example, the connection intermediating device 400 is provided with a USB connecting port to allow bilateral communications with the public communication line 500 by inserting a USB terminal attached to the modem 410 into the USB connecting port.

As described above, according to the first embodiment, it becomes possible to accommodate to the various transmission modes by preparatively storing the second transmission program that accommodates to the transmission mode of the connection intermediating device 400 and by connecting the interface member 300 that corresponds to the transmission mode selected by the selection circuit 150 to an output terminal of the centralized management unit 100.

Furthermore, it becomes possible to construct the management system of the facility equipment compatible with the connection intermediating device 400 used by the user simply and at low cost by storing only the transmission program corresponding to a transmission mode required by the user in the storage section 130 and by connecting the interface member 300 corresponding to the selected transmission program to the output terminal of the centralized management unit 100.

Then, even if the transmission mode of the connection intermediating device 400 changes in the future, it becomes possible to accommodate to the change simply and at low cost by changing the second transmission program stored in the storage section 130 and the interface member 300 corresponding to the changed transmission mode.

Thus, the centralized management unit 100 may be used effectively for a long period of time without changing the design of the basic functions by allowing the members provided around the interface and the programs to be changed.

Furthermore, even if the existing connection intermediating device 400 fails and its transmission mode is non-operative, it becomes possible to compensate for this by changing the second transmission mode stored in the storage section 130 and the interface member 300 corresponding to a transmission mode of a presently commercially available connection intermediating device and it is not necessary to replace the centralized management unit 100 with a new one.

Furthermore, even if no measure to reinforce and insulate the centralized management unit 100 has been taken, it becomes possible to meet a reinforced insulation standard by implementing a measure to reinforce and insulate the interface member 300 and to embed the centralized management unit 100 into a wall or the like within a shop or the like without enlarging the centralized management unit 100.

Furthermore, it becomes possible to freely select places where the centralized management unit 100 and the connection intermediating device 400 are installed by adjusting a length of a cable connecting the output-side interface 120 with the interface member 300 or of a cable connecting the interface member 300 with the connection intermediating device 400.

Second Embodiment

Figure 2:
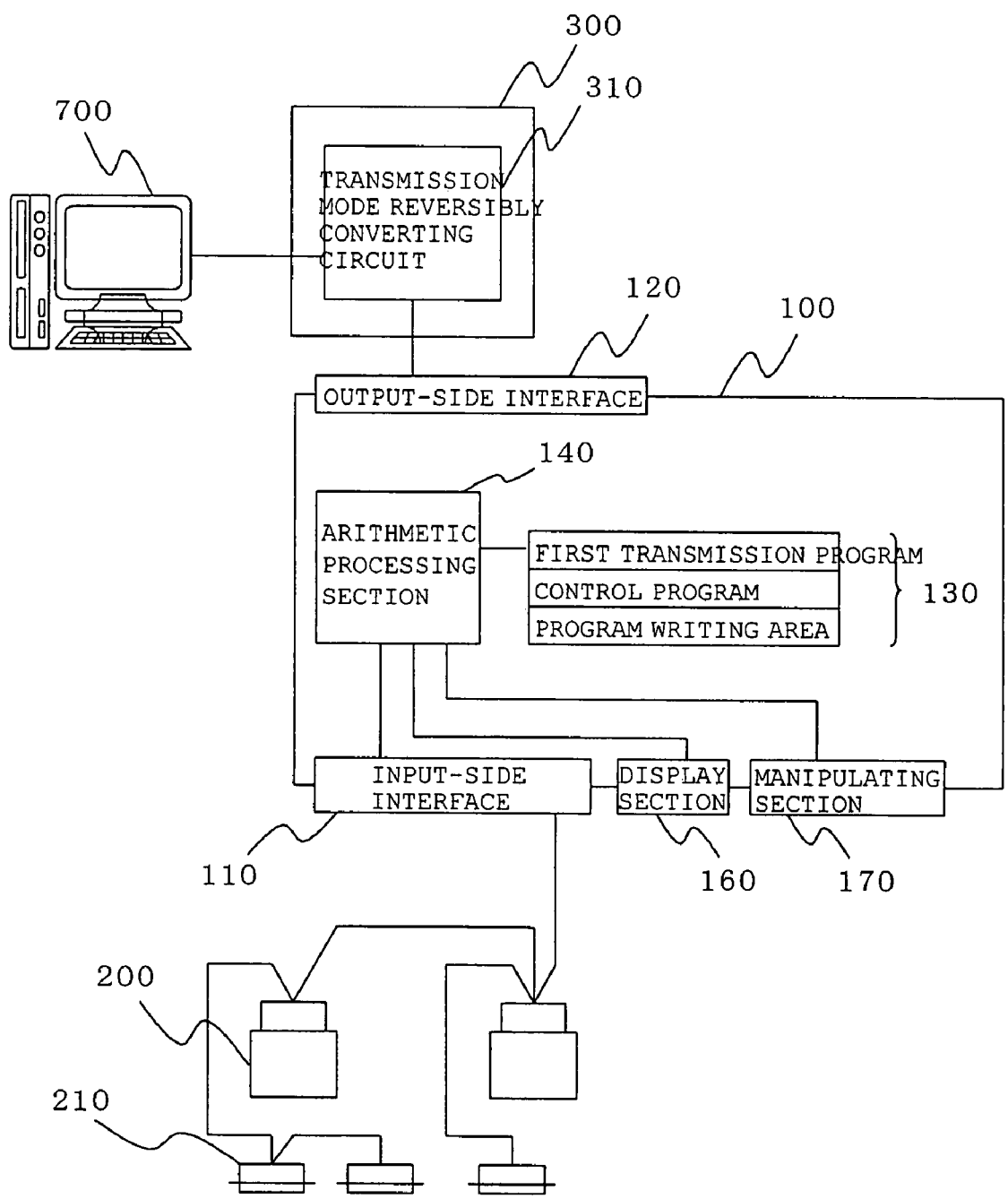
FIG. 2 is a block diagram showing a partial arrangement of a management system of facility equipment according to a second embodiment.

FIG. 2 is a block diagram showing a partial arrangement of the management system of the facility equipment according to a second embodiment.

A management system of the facility equipment of the second embodiment is different from the first embodiment described above in that the selection circuit 150 is omitted, the arrangement of data stored in the storage section 130 is changed and a program setting device 700 is made connectable anew. The arrangement other than those is the same with the first embodiment.

Differences from the first embodiment will be mainly explained below.

The storage section 130 has a storage area in which the first transmission program and the control program are stored in advance and a rewritable program writing area.

The program writing area is provided on the assumption that a second transmission program corresponding to a transmission mode used by the data transmission circuit 420 of the connection intermediating device to be used from now on is stored in the area.

Furthermore, the program setting device 700 is made connectable to one end of the interface member 300 according to the second embodiment.

The program setting device 700 writes and sets the second transmission program corresponding to the transmission mode used by the data transmission circuit 420 of the connection intermediating device 400 to be used from now on into the program writing area of the storage section 130.

Figure 3:
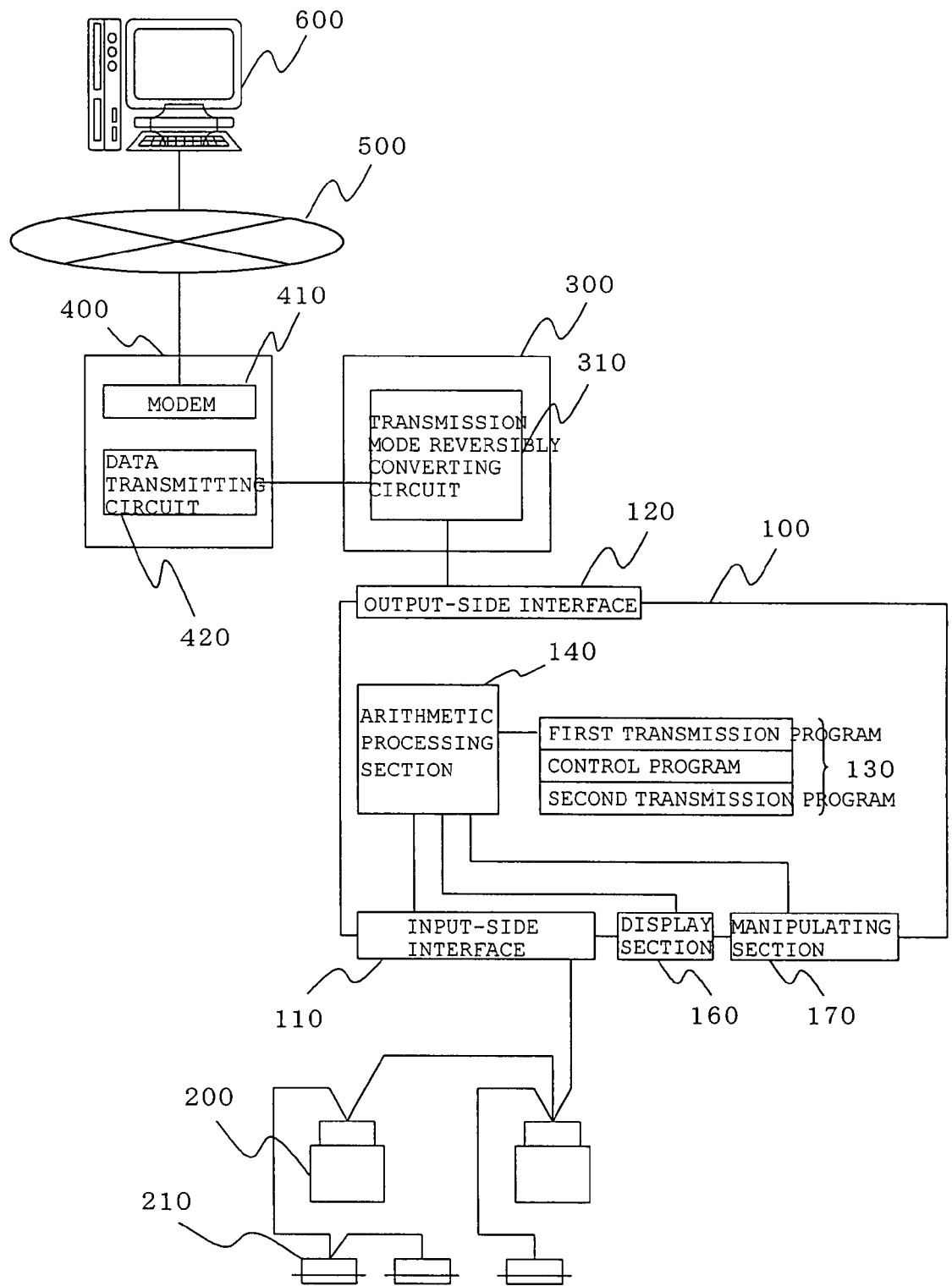
FIG. 3 shows an arrangement after a second transmission program has been written into a program writing area of a storage section 130 by a program setting device 700.

FIG. 3 shows an arrangement at the time after the second transmission program has been written into the program writing area of the storage section 130 by the program setting device 700.

The arrangement shown in FIG. 3 is the same with the first embodiment shown in FIG. 1 except that the information of usability stored in the storage section 130 is omitted and the selection circuit 150 is omitted, so that their explanation will be omitted here.

Next, a flow of processes of the program setting device 700 in setting the second transmission program in the program writing area of the storage section 130 in the second embodiment will be explained.

(1) Connection of the Program Setting Device 700 and Output of the Second Transmission Program:

At first, the program setting device 700 is connected to one end of the interface member 300 where the output-side interface 120 is not connected.

The program setting device 700 outputs the second transmission program via the interface member 300.

(2) Writing Into the Storage Section 130:

The arithmetic processing section 140 receives the second transmission program outputted from the program setting device 700 via the output-side interface 120 in accordance with the instruction of the first transmission program.

Next, the arithmetic processing section 140 writes the received second transmission program to the program writing area in the storage section 130.

(3) Connection of the Connection Intermediating Device 400:

The program setting device 700 is disconnected from the interface member 300 and the connection intermediating device 400 is connected instead.

The connection intermediating device 400 is connected to the public communication line 500 via the modem 410 and is connected to the monitoring terminal 600 via the public communication line 500.

Thus, it becomes possible to bilaterally transmit the data signals of the operation control and monitoring of the air-conditioner to be managed among the centralized management unit 100, the connection intermediating device 400 and the monitoring terminal 600 in the same manner with the first embodiment.

It is noted that a connection interface included in the program setting device 700 uses a transmission mode capable of transmitting data by the first transmission program.

As described above, according to the second embodiment, it becomes possible to accommodate to the interface (and the data transmission circuit 420) provided in the connection intermediating device 400 of the future that cannot be imagined in advance without changing any of the structure of the centralized management unit 100.

Furthermore, even if the connection intermediating device 400 is replaced in the future, it becomes possible to accommodate to that simply and quickly without changing the structure of the centralized management unit 100.

Furthermore, a storage capacity of the storage section 130 may be effectively reduced because the storage section 130 is adapted so that only the second transmission program currently required is written and set by the program setting device 700.

It is noted that although not shown in FIGS. 2 and 3, the information of usability may be stored in the storage section 130 in the same manner with the first embodiment so that only a program set so as to be usable is executed.

Third Embodiment

Figure 4:
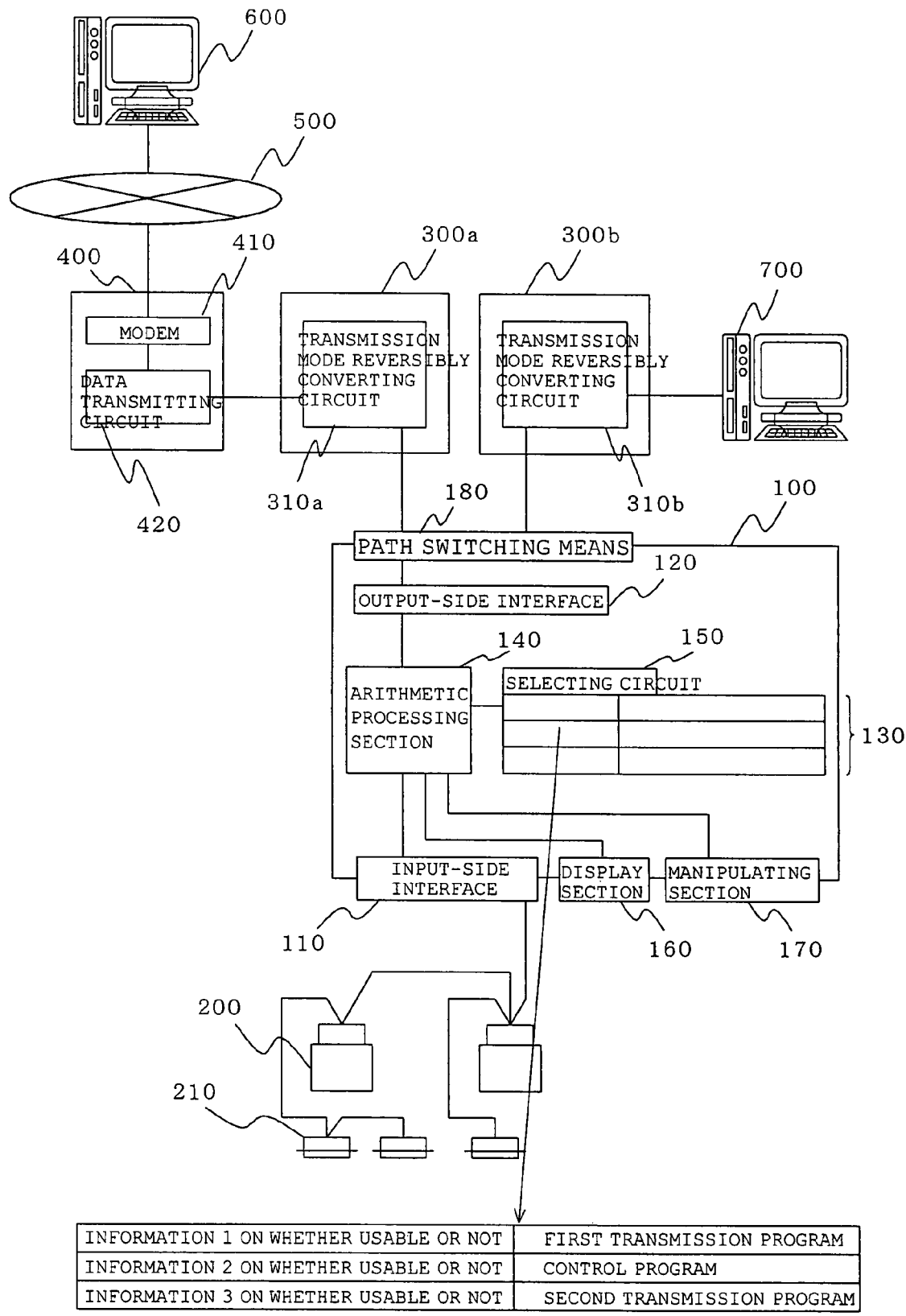
FIG. 4 is a block diagram showing a whole arrangement of a management system of facility equipment according to a third embodiment.

FIG. 4 is a block diagram showing a whole arrangement of the management system of the facility equipment according to a third embodiment.

The management system of the facility equipment of the third embodiment is different from the first embodiment in that the path switching means 180 is provided on the output side of the output-side interface 120 to branch output destinations of the output-side interface 120.

The difference from the first embodiment will be mainly explained below.

In the management system of the facility equipment shown in FIG. 4, the output side of the centralized management unit 100 is branched by the path switching means 180 connected to the output-side interface 120.

An interface member 300a is connected to one branch and an interface member 300b is connected to the other branch.

The interface member 300a is connected with the connection intermediating device 400 in the same manner with the first embodiment. The interface member 300b is always connected with the program setting device 700.

Figure 5:
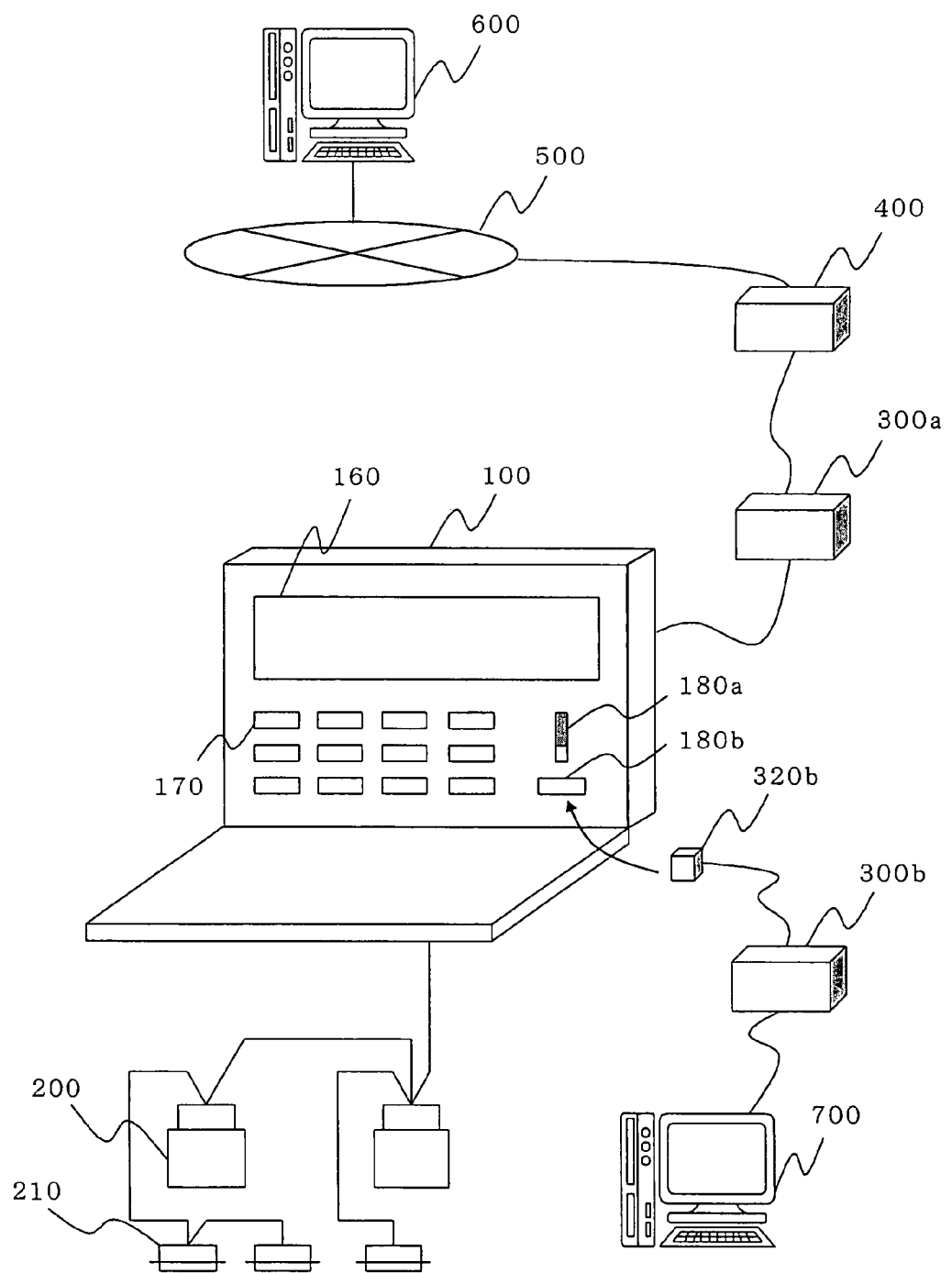
FIG. 5 shows an exemplary arrangement of path switching means 180.

FIG. 5 shows an exemplary arrangement of the path switching means 180.

The path switching means 180 is composed of a socket 180b and a switching contact member 180a, attached to a control panel of the centralized management unit 100. A connector 320b provided at one end of the interface member 300b can be inserted into the socket 180b.

In the management system of the facility equipment shown in FIG. 5, an arrangement is made in installing the centralized management unit 100 on a wall face of a shop not shown in the following manners (1) through (3).

(1) The socket 180b is attached to a back face of a case of the centralized management unit 100:

(2) The connector 320b to be inserted into the socket 180b is attached to one end of the interface member 300b: and (3) A cable for connecting the interface member 300b with the connector 320b is wired behind the wall face where the centralized management unit 100 is anchored.

Thus, it becomes possible to finely fix the centralized management unit 100 on the wall face without hampering its design.

As described above, according to the third embodiment, it becomes possible to effectively improve the efficiency of service works because the program setting device 700 may be removably connected to the centralized management unit 100 without detaching the centralized management unit 100 fixed on the wall face.

Fourth Embodiment

Figure 6:
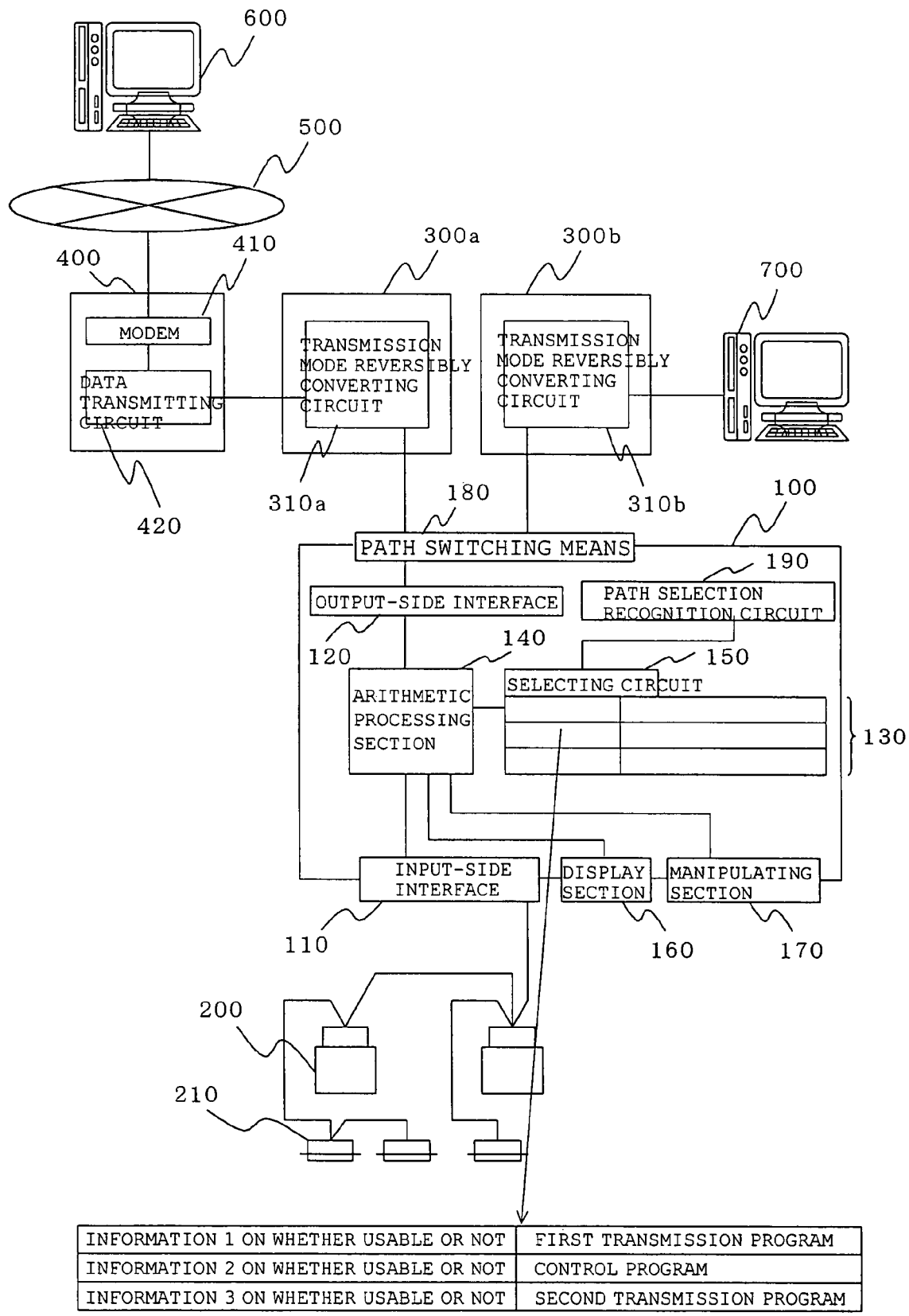
FIG. 6 is a block diagram showing a whole arrangement of a management system of facility equipment according to a fourth embodiment.

FIG. 6 is a block diagram showing a whole arrangement of the management system of the facility equipment according to a fourth embodiment.

The management system of the facility equipment of the fourth embodiment is different from the third embodiment described above in that a path selection recognizing circuit 190 is provided.

The difference from the third embodiment will be mainly explained below.

The path selection recognizing circuit 190 recognizes which data transmission path of the branch paths is selected by the path switching means 180.

The arithmetic processing section 140 carries out the following processes corresponding to the recognition state of the path selection recognizing circuit 190.

(1) A Case When the Program Setting Device 700 is Connected:

When the path selection recognizing circuit 190 recognizes that the data transmission path between the output-side interface 120 and the program setting device 700 is selected, the arithmetic processing section 140 exchanges information with the program setting device 700 in accordance with the instruction of the first transmission program.

(2) A Case When the Connection Intermediating Device 400 is Connected:

When the path selection recognizing circuit 190 recognizes that the data transmission path between the output-side interface 120 and the connection intermediating device 400 is selected, the arithmetic processing section 140 exchanges information with the connection intermediating device 400 in accordance with the instruction of the second transmission program.

It is noted that the path selection recognizing circuit 190 may be arranged also as follows:

(1) A switching contact for transferring data indicating the state of selection of the path to the arithmetic processing section 140 is provided in a switching contact member 180a.

(2) The arithmetic processing section 140 tries information exchange by the respective transmission programs stored in the storage section 130 to recognize the selected path by determining whether data transfer is actually enabled or not.

As described above, according to the fourth embodiment, because the information exchange is enabled between the program setting device 700 and the connection intermediating device 400 each having a different data transmission path, it becomes possible to apply the connection intermediating device 400 provided with an arbitrary data transmission circuit simply and quickly by always fixing the program setting device 700 and the interface member 300, which are otherwise carried by a serviceman, without repeating attachment/detachment thereof.

Fifth Embodiment

There is a possibility that when a third party tampers with the information of usability for each program, the transmission mode of the connection intermediating device 400 and the control contents of the facility equipment are used without notice to an administrator in each embodiment described above. It is then contemplated to encrypt the information of usability for each program in shipping the centralized management unit 100 out of a factory to prevent it.

However, if the encrypted information of usability is fixedly stored in the storage section 130, the problem of unnoticed use described above may occur when an installer of the centralized management unit 100 finds out the encrypted information for example.

Still more, the method of setting the information of usability in shipping out of the factory increases managerially economical burden of the manufacturer of the centralized management unit 100 and causes a problem that the manufacturing cost of the whole management system of the facility equipment becomes expensive.

Then, the fifth embodiment of the invention discloses an arrangement that eliminates the above-mentioned problem and provides the facility equipment operation controlling and monitoring functions required by the user at an adequate cost.

FIG. 7 shows a procedure related to setting of the information of usability.

FIG. 7A shows a processing procedure in shipping the centralized management unit 100 out of the factory, FIG. 7B shows program use permission numbers and FIG. 7C shows a procedure in setting the use permission number of the second transmission program.

As shown in FIG. 7A, an unique manufacturing number code is inputted to the centralized management unit 100 by the program setting device 700 connected with the centralized management unit 100 to be shipped via the interface member 300b in shipping the centralized management unit 100 out of the factory.

The inputted manufacturing number code is stored in the storage section 130.

FIG. 7B shows a rule of the program use permitting numbers.

As shown in FIG. 7B, the arithmetic processing section 140 calculates in accordance with an arithmetic algorism represented by the manufacturing number code and function f in which a program number code is a variable.

The program is determined to be usable only when the calculated value of function coincides with an uniquely set program password, and the information of usability for the program is set to the effect that it is usable.

FIG. 7C shows a state in setting the use permission number of the second transmission program in installing the centralized management unit 100 at a user specified location where the facility equipment is to be installed.

In installing the centralized management unit 100 at the location where the facility equipment is installed, the installer of the facility equipment inputs a program password by the program setting device 700 connected via the interface member 300*b* in the same manner as shown in FIG. 7A.

When the inputted password coincides with the password calculated by the method explained in FIG. 7B, the information on whether a program is usable or not is set to be usable and operation of the centralized management unit 100 and the connection intermediating device 400 is effected.

The manufacturer of the centralized management unit 100 or the facility equipment can steadily recover charges for using the control program and the second transmission program by charging for the provision of the program use permission number to the installer.

It also becomes possible to sell the facility equipment efficiently at low cost by adopting a sales system using the password containing the use permission number in providing the program use permission number with payment because Internet and the like can be utilized.

It is noted that the arithmetic algorism of the program password is not limited to what has been explained in connection with FIG. 7B and any method may be used as long as the password is uniquely defined.

Furthermore, the method of causing the installer and others of the facility equipment to input the password is not limited to the method carried out by the program setting device 700 explained in connection with FIG. 7C and may be a method in which the password is inputted directly by using the manipulating section 170 of the centralized management unit 100, for example.

Sixth Embodiment

Figure 8:
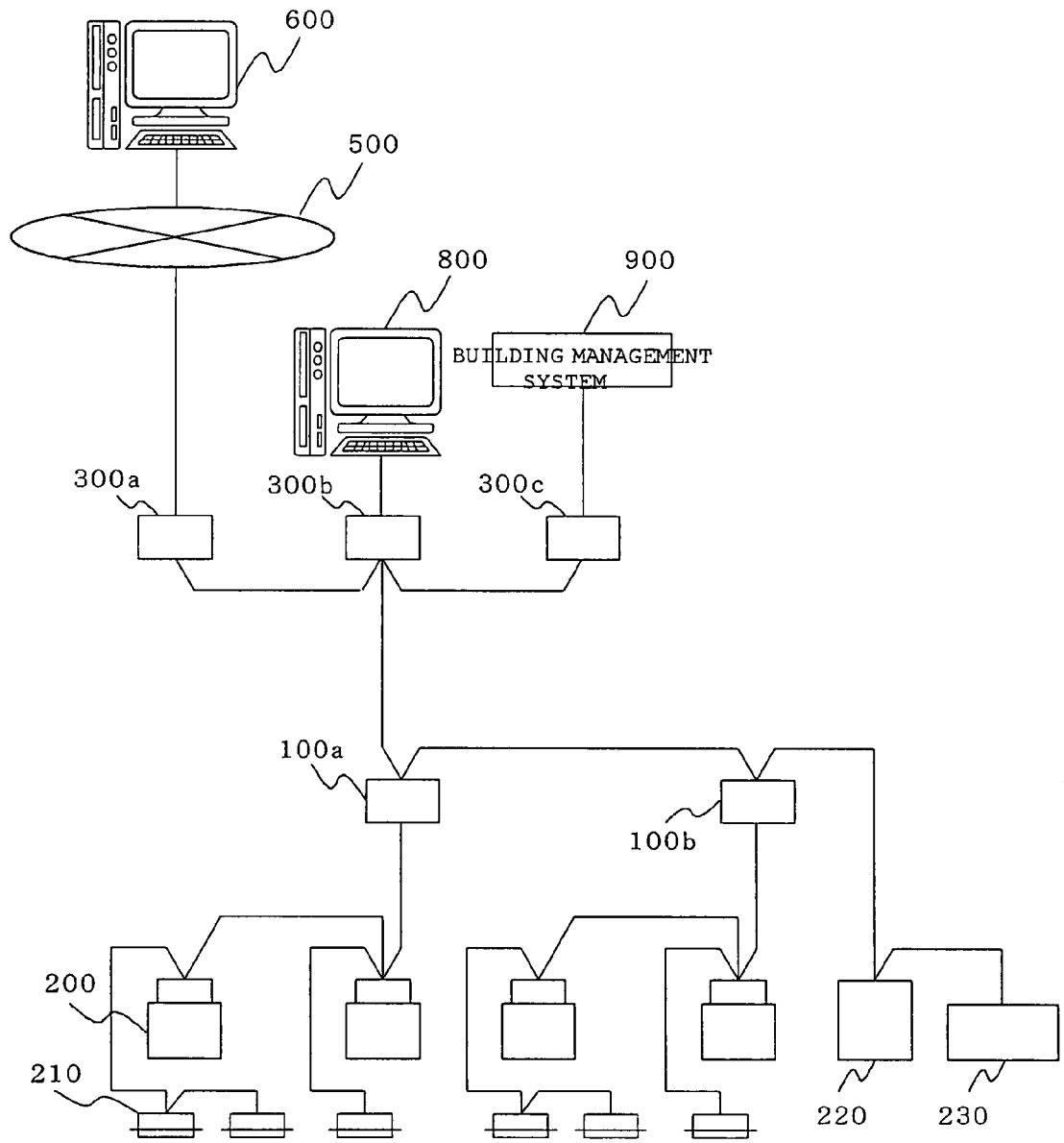
FIG. 8 is a block diagram showing a whole arrangement of a management system of facility equipment according to a sixth embodiment.

FIG. 8 is a block diagram showing a whole arrangement of the management system of the facility equipment according to a sixth embodiment.

In FIG. 8, an interface of EIA standard RS485 is used instead of the EIA standard RS232C, as the output-side interface of the centralized management units 100*a* and 100*b*.

In FIG. 8, a refrigerator 220 and a cooling showcase 230 are subjects to be managed similarly to the air-conditioner.

The refrigerator 220 and the cooling showcase 230 are often manufactured by different makers and generally they adopt the EIA standard RS485 as their interface.

It becomes possible for the centralized management units 100*a* and 100*b* to exchange information with each of the air-conditioners, the refrigerator 220 and the cooling showcase 230 and to manage all thermal equipments in one and same store by using the EIA standard RS485 for the interfaces of the communications with the refrigerator 220 and the cooling showcase 230.

The monitoring terminal 600 can manage a plurality of centralized management units (the centralized management units 100*a* and 100*b* in FIG. 8) via the public communication line 500 and an interface member 300*a*.

A building monitoring apparatus 800 installed within a building can also manage a plurality of centralized management units (the centralized management units 100*a* and 100*b* in FIG. 8) via an interface member 300*b*.

A building management system 900 can also manage a plurality of centralized management units (the centralized management units 100*a* and 100*b* in FIG. 8) via an interface member 300*c*.

The centralized management unit can be compatible with the various transmission modes by replacing the second transmission program within the centralized management units 100*a* and 100*b* and the interface members 300*a*, 300*b* and 300*c* to those corresponding to the interface included in each equipment.

The centralized management unit can transmit data to all monitoring terminals and the like by replacing the second transmission program and the interface members corresponding to the interface included in each monitoring terminal and the like, such as Modem GSM communications for the monitoring terminal 600, USB Ethernet (Registered Mark) communications for the building monitoring apparatus 800 and EIB (European Installation Bus) Mode Bus for the building management system 900.

As described above, according to the sixth embodiment, the transmission mode allowing three or more communication equipments to be connected is used and the centralized management units 100*a* and 100*b* are allowed to exchange information via the interface members 300*a*, 300*b* and 300*c*, so that the plurality of centralized management units (the centralized management units 100*a* and 100*b* in FIG. 8) can manage in total in association with the monitoring terminal 600, the building monitoring apparatus 800 and the building management system 900, respectively.

Seventh Embodiment

Figure 9:
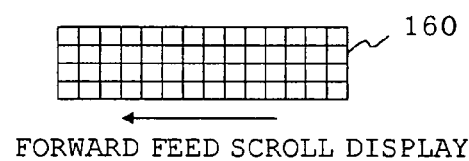
FIG. 9 explains about a display section 160 included in a centralized management unit 100 of a management system of facility equipment according to a seventh embodiment.

FIG. 9 explains about the display section 160 included in the centralized management unit 100 of the management system of the facility equipment according to a seventh embodiment.

The display section 160 is made by using a dot matrix liquid crystal display in which any character can be displayed and displays information from the monitoring terminal 600 obtained via the communication line.

Even if a message is longer than the display section 160 and cannot be displayed at a time, the whole information may be displayed on the display section 160 by a known display circuit (not shown) by means of feed forward scroll.

As described above, according to the seventh embodiment, in a case when the remote monitoring terminal informs the user of contents of diagnosis at the time of occurrence of abnormality in the facility equipment, the whole message can be displayed even if the display section 160 is small like that of a small centralized management unit installed in a small shop.

It is noted that although the air-conditioner, refrigerator and the like have been subjects to be managed in the embodiments described above, it is needless to say that the invention may be applied similarly to various facility equipments installed within a building or the like.

The invention claimed is:

1. A centralized management unit of facility equipment, which obtains management data by being connected to at least one piece of facility equipment to be managed and transmits the data to a monitoring terminal via a connection intermediating device, comprising:
    an input-side interface connected to said facility equipment to be managed;
    an output-side interface for outputting said management data of said facility equipment and for receiving information transmitted from said monitoring terminal;
    a storage section for storing a control program of said facility equipment; and
    an arithmetic processing section for controlling said facility equipment in accordance with an instruction of said control program; wherein
    said storage section stores a first transmission program corresponding to said input-side interface and a second transmission program corresponding to an interface of said connection intermediating device; and
    said arithmetic processing section obtains said management data from said facility equipment via said input-side interface in accordance with an instruction of said first transmission program and outputs said management data to said output-side interface in a mode corresponding to the interface of said connection intermediating device in accordance with the instruction of said second transmission program.

2. The centralized management unit of the facility equipment as set forth in claim 1, further comprising an interface member for reversibly converting an electrical signal corresponding to said output-side interface to an electrical signal corresponding to said interface of said connection intermediating device; wherein
    said interface member is connected to said output-side interface.

3. The centralized management unit of the facility equipment as set forth in claim 1, wherein said second transmission program is adapted to use a transmission mode through which information can be exchanged with each of three or more connected devices.

4. The centralized management unit of the facility equipment as set forth in claim 1, wherein said arithmetic processing section stores a program in an area for storing said second transmission program, on the basis of information received from said output-side interface on said program to be stored in said area where said second transmission program is stored.

5. The centralized management unit of the facility equipment as set forth in claim 4, further comprising path switching means for branching output destinations of said output-side interface; wherein
    said path switching means is adapted to output said management data of said facility equipment from one branch path; and
    a program setting device for setting information related to a program to be stored in the area where said second transmission program is stored is connected to the other branch path.

6. The centralized management unit of the facility equipment as set forth in claim 5, wherein
    said path switching means is composed of a socket and a switch contact member.

7. The centralized management unit of the facility equipment as set forth in claim 5, further comprising a path selection recognizing means for recognizing that equipment is connected to which branch path of said path switching means; wherein
    said arithmetic processing section receives said second transmission program via said output-side interface in accordance with the instruction of said first transmission program when said path selection recognizing means recognizes connection with said program setting device and outputs said management data to said output-side interface in accordance with the instruction of said second transmission program when said path selection recognizing means recognizes connection with said connection intermediating device.

8. The centralized management unit of the facility equipment as set forth in claim 1, wherein
    said storage section holds information on whether each program is usable or not that defines whether each program is usable or not; and
    said arithmetic processing section executes a program defined to be usable by said information on whether each program is usable or not, among respective programs stored in said storage section.

9. The centralized management unit of the facility equipment as set forth in claim 8, further comprising inputting means for inputting a password for changing said information on whether each program is usable or not so that said information denotes that said program is usable; wherein
    said arithmetic processing section changes a part correlated with said password under a predetermined relationship among said information on whether each program is usable or not by receiving said password inputted from said inputting means.

10. The centralized management unit of the facility equipment as set forth in claim 1, further comprising a display section for displaying information transmitted from said monitoring terminal.

11. A management system of facility equipment, comprising:
    the centralized management unit of the facility equipment as set forth in claim 1;
    a connection intermediating device for connecting said centralized management unit to a network; and
    a monitoring terminal for exchanging data with said centralized management unit via said network.

* * * * *